United States Patent

[11] 3,628,240

[72] Inventor Norman A. Bender
 Fort Wayne, Ind.
[21] Appl. No. 803,395
[22] Filed Feb. 28, 1969
[45] Patented Dec. 21, 1971
[73] Assignee General Electric Company

[54] METHOD AND APPARATUS FOR TREATING MAGNETIC CORES AND WINDINGS
 11 Claims, 3 Drawing Figs.

[52] U.S. Cl. .................................................. 29/596,
 29/203 L, 29/205 R, 29/205 D, 29/421, 29/609,
 225/103
[51] Int. Cl. ........................................................ H02k 15/00
[50] Field of Search ............................................ 29/596,
 598, 609, 205, 203 L, DIG. 46, 421; 225/103;
 335/258

[56] References Cited
 UNITED STATES PATENTS

| | | | |
|---|---|---|---|
| 1,762,017 | 6/1930 | Grenzer .......................... | 29/203 X |
| 1,813,802 | 7/1931 | Hildebrand .................... | 29/609 UX |
| 2,876,429 | 3/1959 | Noztitz .......................... | 335/258 X |
| 2,980,157 | 4/1961 | Rediger .......................... | 29/205 X |
| 3,421,208 | 1/1969 | Larsen et al. .................. | 29/609 |

*Primary Examiner*—John F. Campbell
*Assistant Examiner*—Carl E. Hall
*Attorneys*—Allard A. Braddock, Harold J. Holt, John M. Stoudt, Frank L. Neuhauser and Oscar B. Waddell ABSTRACT: A device utilizing high-energy electrical pulses for positioning coil windings in core slots of the stator of a dynamoelectric machine, for applying mechanical force to position the end turns of such windings, and for pounding stator cores to reduce core loss comprises a top and bottom plate positioned by tie rods which have nuts for adjusting the separation distance of the plates, a flat coil winding overlying the bottom plate, and a metal plate overlying the flat coil. When the device is used to pound stator cores a stator is placed on the metal plate and a high-energy electric pulse is sent through the flat coil. This creates a strong transient magnetic field which causes the metal plate to snap the stator against the top plate of the device. When the device is used to position coil windings in the stator, forming blocks having annular grooves to fit the end turns of stator coils are positioned on the metal plate and top plate and a stator with loose coil windings placed therebetween. The coil windings themselves are then subjected to a high-energy pulse, or series of such pulses. This compacts the windings within the stator core slots and draws the end turns down toward the stator core. The forming blocks are then positioned against the end turns and the flat coil is energized by a high-energy electrical pulse, or series of such pulses. The transient magnetic field created thereby causes the metal plate to move toward the top plate thereby squeezing the stator and end turns between the two forming blocks. The mechanical working of the end turns produced by this squeezing positions them firmly in the desired relationship to the stator core.

PATENTED DEC 21 1971

3,628,240

INVENTOR
NORMAN A. BENDER
BY
Allard A. Braddock
ATTORNEY 3,628,240

METHOD AND APPARATUS FOR TREATING MAGNETIC CORES AND WINDINGS

BACKGROUND OF THE INVENTION

When a magnetic coil is subjected to a high-energy electric power impulse the resulting interaction of current and magnetic fields creates a force which may be utilized to achieve desired ends. In Linkous U.S. Pat. No. 3,333,329, which is assigned to the same assignee as the present invention, such an impulse was used to pack coil windings in core slots of the stator of a dynamoelectric machine. In Gibbs and Rushing application Ser. No. 426,991, filed Jan. 21, 1965, which issued Jan. 14, 1969 as U.S. Pat. No. 3,421,209, and is also assigned to the same assignee as the present application, a magnetic field produced by a high-energy impulse was utilized to separate the laminations of a stator core thereby reducing the electrical losses caused by interlaminate metallic bonds established during fabrication.

BRIEF SUMMARY OF THE INVENTION AND OF THE DRAWING

One object of the present invention is to provide a new and improved device for compacting coils and accomplishing a reduction of stator core losses.

It is another object of the present invention to provide a new and improved apparatus for reducing the core loss of a laminated magnetic core.

It is still another object of the present invention to provide a new and improved method of reducing the core loss of a laminated magnetic core.

It is yet another object to provide a new and improved method of positioning one or more winding coils of a stator and effecting a reduction of stator core losses.

It is a still further object of the present invention to provide new and improved apparatus for positioning at least selected portions of a winding supported by a wound laminated magnetic core relative to the core.

The present invention preferably is embodied in one form in to a device or fixture in which a stator core may be mounted and force applied to spread the laminations or in which, a stator core with windings in place may be mounted and the windings may be positioned according to the method described in the aforementioned Linkous U.S. Pat. No. 3,333,329. After application of the Linkous method, the end turns of the stator coil may be finally placed in position by mechanical working resulting from the application of a high-energy electrical impulse and the operation of one or more forming blocks.

Apparatus embodying the invention in a preferred form includes a device or fixture having a bottom plate and top plate spaced somewhat from each other and held in position by tie rods. The bottom or base plate has a flat electrical coil mounted thereon. Overlying the coil is a metal plate which is free to move with respect to the coil. Circuit control terminals may be conveniently positioned on an exterior surface of the device to provide quick switching between circuits.

The operation of the device will be readily understood from the drawing in which.

DETAILED DESCRIPTION

Figure 1:
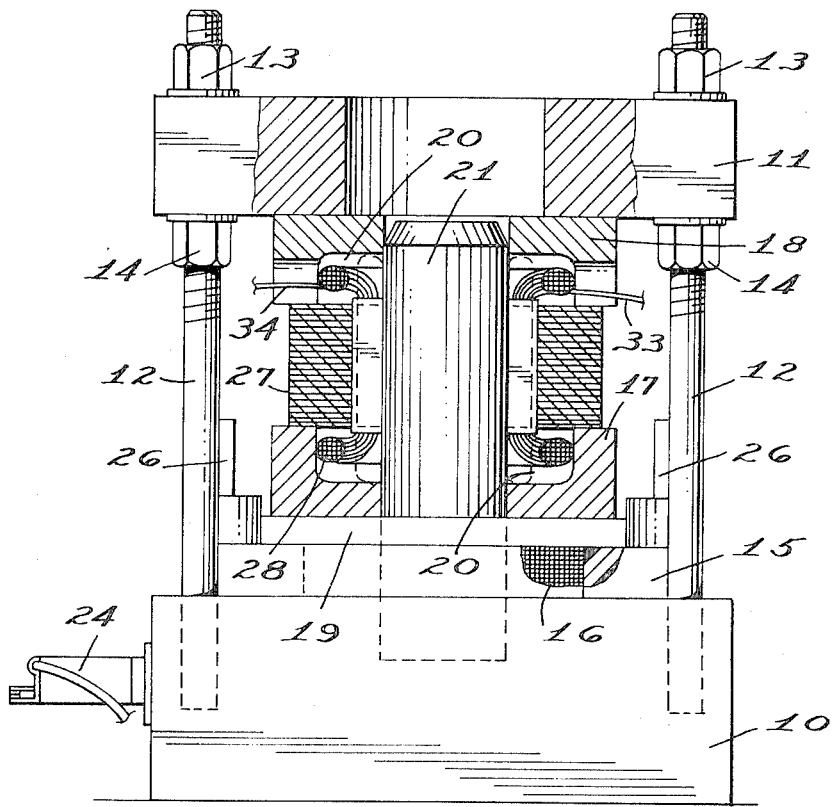
FIG. 1 is a front view partly in section showing a device or fixture embodying the invention.

Referring to the drawing, the illustrated device or fixture provides a means for accommodating a laminated magnetic core and comprises a base or bottom plate 10 and a top plate 11, normally composed of metal, which are held in spaced-apart position by a number of tie rods 12. Each of the tie rods 12 has a tightening nut 13 and an adjusting nut 14, the latter serving to vary the spacing between the bottom plate 10 and top plate 11.

A flat electrically energizable stationary magnetic coil 16, sometimes referred to as a pancake coil, is mounted on top of the bottom plate 10 and provides means for producing a magnetic field upon application of an energy impulse thereto. While not absolutely necessary it is desirable to protect the coil 16 by positioning it in a plate 15 of electrically nonconducting material such as plastic laminate. Overlying the coil 16 is a member or plate 19 composed of a metal such as copper or aluminum. The plate 19, which is positioned between the guide members 26, is not fastened to the coil 16 or plate 15 and is, therefore, free to move in an upward direction.

A series of terminals 22, 23, and 24 are mounted on the bottom plate 10. A single pole double throw switch 25 is manually set to select a circuit through the terminals 22 and 23 which supply a stator winding 28 or the terminals 23 and 24 which supply the pancake coil 16. These terminals are incorporated in a circuit which provides a high-energy electrical impulse. A source of such impulses may be provided by the discharge of a capacitor bank. One suitable source is described in Linkous U.S. Pat. No. 3,333,329 which patent is incorporated herein by reference. In view of the fact that such circuits are not a part of this invention, they are not described in detail herein. Conventional power sources can supply impulses of several thousand joules at several thousand volts. In selecting the impulse to be used the limiting factor is the energy level at which coil insulation or the coil metal itself will be damaged. In order to avoid serious damage, the normal practice is to provide a series of impulses of increasing magnitude.

Figure 2:
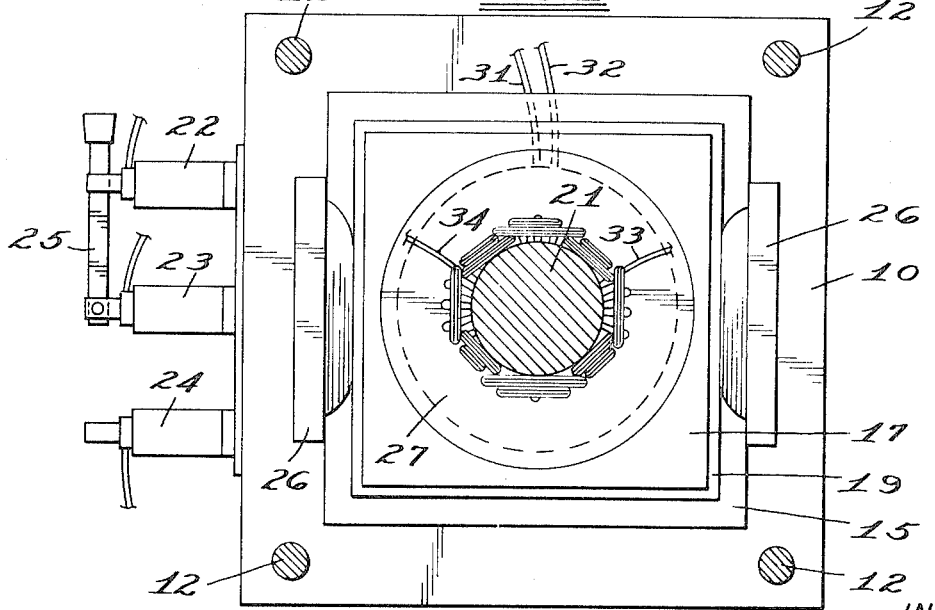
FIG. 2 is a top view partly in section showing the use of forming blocks.

The use of the device shown in FIGS. 1 and 2 for pounding stator core laminations will now be described. A stator core such as that shown at 27 in FIG. 1 is positioned directly on a surface defined at least partly by the plate 19 which thus is sandwiched between the coil 16 and one end of the stator 27. A high-energy impulse is then sent and generated through coil 16. This produces a transient magnetic field, the force of which impels or snaps the plate 19 in the direction of the stationary top plate or member 11. The stator core 27 strikes the surface of the top plate 11 with a force proportional to the magnitude of the impulse. This magnitude is adjusted to provide the minimum impulse which can effectively sever interlaminate metallic bonds. While the stator core is described as striking the top plate 11 which is at least slightly spaced from the top end face of the stator as viewed in FIG. 1, it is desirable to mount a separate bang plate (not shown) on the underside of the top plate 11 so as to protect this member from damage from repeated pounding by stator cores.

In order to position the end turns of coils 28, the apparatus is equipped with coil-end turn forming members in the forms of a bottom coil-end turn forming block 17 and a top coil-end turn forming block 18. These forming blocks are preferably composed of a relatively soft material such as a laminated plastic and are equipped with annular grooves 20 which are shaped to fit the end turns of the coil 28. Means for maintaining alignment of the core relative to the block 17 is illustrated as a nonmagnetic plug or cylindrical structure 21 composed of copper, aluminum or similar metal and is positioned within the aligned center apertures of the blocks 17 and 18 as illustrated to serve as a positioning means for mounting a stator core 27 in the device and aid in positioning or throwing back windings as described in Rushing U.S. Pat. No. 3,333,328. As may be seen in FIG. 1, the top plate 11 may be U-shaped in order to allow easy positioning and removal of the stator core 27.

Figure 3:
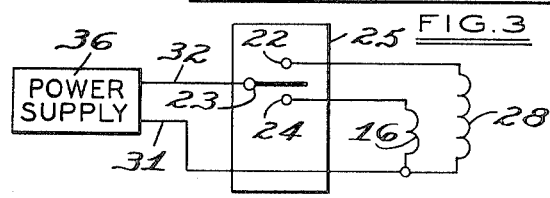
FIG. 3 is a schematic circuit diagram illustrating the control circuit.

Referring particularly to FIG. 3, a lead 31 from a power supply 36 is connected to the flat coil 16 and the stator winding 28. The other end of the flat coil 16 is connected to the terminal 24 and the other end of the stator winding 28 is arranged for easy connection to the terminal 22. The terminals 22 and 24 are selectively connectable by means of the switch 25 through a lead 32 to the power supply 36 to complete the energizing circuit.

The operation of the device will now be described with reference to all of its functions. Initially, the forming blocks 17 and 18 are removed and a stator core 27 without a coil winding is mounted within the device. The single pole switch 25 is closed across the terminals 23 and 24. The power supply is now set to the energy level which has proved to be the minimum satisfactory to break the interlaminate metallic bonds of the particular stator core 27 which is the workpiece. A high-energy impulse or surge of electrical current is now passed through the coil 16. The magnetic field produced by this impulse impels the metal plate 19 and stator core toward the top plate 11. The impact of the laminated stator core 27 on the top plate 11 breaks the interlaminate bonds of the stator core 27, thereby loosening the stator core laminations to reduce the electrical core losses as will be understood by those skilled in the art. The stator core is then removed from the device and placed in a separate machine which loosely inserts the coil winding 28 in the slots of the stator core. The forming block 17 is now placed in the device as shown and the stator including the winding is inserted over the nonmagnetic member 21 so as to be positioned thereby and supported on the forming block 17; and the forming block 18 is placed thereover. One end of the winding 28 is connected to the terminal 22 and the other end is connected to the power supply lead 31. The single pole switch 25 is then operated to close a circuit through the terminals 22 and 23. A high-energy impulse is now sent through the circuit to generate a surge of electrical current in the conductor turns of the stator coil. Electrical magnetic forces resulting from this impulse produce a force on the winding 28 which tends to seat the winding deep within the core slots of the stator core 27 and thus compact the winding coils and also tends to impel or draw the end turns toward the stator core. In order to minimize the stress on the insulation of the winding 28, it is desirable to deliver several impulses of mounting intensity over spaced intervals of time as described in the Linkous patient aforementioned.

The single pole switch 25 is now returned to its position where it connects the terminals 23 and 24. A high-energy impulse is sent through the flat coil 16 in the same manner as when the stator core 27 was being treated to break the interlaminate metallic bonds. Now, however, the presence of the soft-surface forming blocks 17 and 18 results in the application of mechanical squeezing to the end turns of the winding 28. In order to minimize the risk of damage to the insulation of the windings, this part of the process may be broken into several impulses of mounting intensity delivered at spaced intervals of time. While a single device has been described as performing both a delaminating and a coil-positioning function, it will be understood that in practice those functions will usually be performed by two separate devices.

In order to help position and brace the parts, the apparatus illustrated has been provided with base numbers 26 on each side of the device. However, these, as well as other parts, may be omitted or altered without departing from the spirit of the invention. For instance, it is not necessary that the distance between the bottom plate 10 and the top plate 11 be variable and other means than the tie rods 12 can be used to hold the parts in their proper orientation. Accordingly, it is believed that the invention should be limited in scope only as may be necessitated by the scope of the appended claims.

What I claim as new and desire to secure by Letters Patent of the United States is:

1. A device for compacting coils and loosening stator core laminations to reduce stator core losses comprising: spaced top and bottom plates; an electrically energizable stationary coil mounted in a plate composed of electrically nonconducting material overlying said bottom plate; a metallic plate overlying said coil, a bottom coil-end turn forming block for forming the end turns adjacent one end of a wound laminated core overlying the metallic plate, and a top coil-end turn forming block for forming the end turns adjacent the other end of the wound laminated core contacting the top plate, whereby energizing said coil creates a magnetic field, the force of which impels said metallic plate toward said top plate.

2. A device as claimed in claim 1 in which the coil-end turn forming blocks have aligned center apertures and a nonmagnetic stator-positioning and wire-positioning member is mounted in the center aperture of the bottom coil-end turn forming block.

3. A method of selectively (1) loosening laminations of a stator core to reduce stator core losses and (2) positioning the coil of the stator comprising: positioning a stator, a movable plate, and a stationary coil with the movable plate sandwiched between the coil and one end of the stator; positioning a stationary plate spaced slightly from the other end of the stator; generating at least one surge of electrical current in the stationary coil such that the movable plate impels the stator against the stationary plate to loosen the laminations forming the stator core; positioning a coil-end turn forming block at each end of the stator; generating at least one surge of electrical current in the conductor turns of the stator coil such that the end turns of the stator coil are impelled toward the stator core; and generating at least one surge of electrical current through the stationary coil to create a magnetic field, the force of which impels the movable plate toward the stator to squeeze the stator coil end turns between the coil-end turn forming blocks.

4. Apparatus for reducing the core loss of a laminated magnetic core, said apparatus comprising means for accommodating a laminated magnetic core, said means including first and second members spaced apart for accommodating the laminated magnetic core therebetween, a first one of said members defining at least a part of a first surface for engagement with a first end of the laminated magnetic core, a second one of said members defining at least a part of a second surface for engagement by the laminated magnetic core at least when the core is impelled thereagainst by the first member, and means adjacent said first member for producing a magnetic field upon application thereto of an energy impulse preselected to impel by the force of said magnetic field said first member toward said second member with a force sufficient to impact the laminated magnetic core against the second surface, whereby the laminated magnetic core is impelled by the first member and impacts against the second member as the magnetic field is produced and interlaminate bonds within the laminated magnetic core are broken to achieve a reduction in electrical losses of the laminated magnetic core.

5. The apparatus of claim 4 wherein said means for producing a magnetic field comprises an electrically energizable stationary coil, said second member is supported a predetermined distance from said stationary coil, and said first member is disposed between said stationary coil and said second member.

6. The apparatus of claim 4 further including an apparatus base and means for supporting said second member a preselected distance from the base; and wherein the means for producing a magnetic field comprises an electrically energizable stationary coil overlying the base and supported in fixed relation relative thereto, said first member being disposed between said stationary coil and said second member.

7. Apparatus for positioning selected portions of a winding supported by a wound laminated magnetic core relative to the core, the apparatus comprising a stationary electrically energizable coil, means for supporting the electrically energizable coil, support means for supporting a wound laminated magnetic core, core positioning means for positioning a wound laminated magnetic core relative to the supporting means; and a first coil-end turn forming block for forming the end turn portions of a winding at one end of a wound laminated core; said electrically energizable coil producing a magnetic field upon application thereto of a preselected electrical energy impulse, the force of said magnetic field effecting movement of a laminated core toward the coil-end turn forming block whereby the end turn portions of the winding at the one end of the wound laminated core are pressed and formed against the coil-end turn forming block.

8. The apparatus of claim 7 wherein said supporting means comprises a second coil-end turn forming block for forming the end turn portions of a winding at the other end of the wound laminated core and wherein said supporting means are impelled toward the first coil-end turning block upon energization of the energizable coil; whereby the end turn portions of the winding at the other end of the wound laminated core are pressed and formed by the second coil-end turn forming block, said second coil-end turn forming block moving toward the first coil-end turn forming block upon energization of said energized coil.

9. The apparatus of claim 7 further including switch means for selectively connecting said energizable coil and the winding supported by the wound core to an electrical energy impulse source.

10. A method of reducing the core loss of a laminated magnetic core comprising the steps of positioning the magnetic core adjacent to a first member engageable with the magnetic core, producing a magnetic field in the vicinity of the first member and thereby impelling by the force of said magnetic field the first member and magnetic core toward a second member, and breaking interlaminate bonds within the magnetic core to achieve a reduction in electrical losses of the laminated magnetic core by impacting the magnetic core against the second member.

11. A method of forming at least a portion of the coil-end turn portions of a winding supported on a laminated magnetic core against a coil-end turn forming member, said method comprising the steps of positioning the magnetic core adjacent a first member engageable with the magnetic core, producing a magnetic field in the vicinity of the first member, and thereby impelling by the force of said magnetic field the first member and magnetic core toward a coil-end turn forming member and causing the coil-end turn portions of the winding adjacent one end of the laminated core to be formed against the coil-end turn forming member.

* * * * *